(12) United States Patent  
Tyson

(10) Patent No.: US 6,874,887 B2
(45) Date of Patent: Apr. 5, 2005

(54) MULTIFOCAL CONTACT LENS

(75) Inventor: Mark K. Tyson, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/410,498

(22) Filed: Apr. 9, 2003

(65) Prior Publication Data

US 2004/0201821 A1 Oct. 14, 2004

(51) Int. Cl.[7] .............................................. G02C 7/06
(52) U.S. Cl. ...................................... 351/161; 351/169
(58) Field of Search ............................ 351/160 R, 161, 351/168, 169

(56) References Cited

U.S. PATENT DOCUMENTS

| 4,636,049 A | * | 1/1987 | Blaker ........................ 351/161 |
| 4,752,123 A | * | 6/1988 | Blaker ........................ 351/161 |
| 5,181,053 A | * | 1/1993 | Brown ........................ 351/161 |
| 5,517,260 A | * | 5/1996 | Glady et al. ................. 351/169 |
| 6,390,622 B1 | * | 5/2002 | Muckenhirn et al. ........ 351/161 |

* cited by examiner

Primary Examiner—Scott J. Sugarman
Assistant Examiner—Darryl J. Collins
(74) Attorney, Agent, or Firm—Craig E. Larson

(57) ABSTRACT

A multifocal contact lens includes a first, central zone for distance and intermediate vision and a second, outer zone for near vision. The first and second zones are conic sections joined tangentially at their junction. The power in the distance subregion is relatively constant, while the power throughout the intermediate subregion is a monotonically increasing function which reaches the near power correction at the junction. The second zone includes an aspheric surface having an eccentricity calculated to minimize or eliminate spherical aberration. The slope or power gradient in the intermediate subregion is calculated to provide a smooth transition from the lower power distance subregion to the junction between the intermediate subregion and the near power correction zone.

16 Claims, 2 Drawing Sheets

MULTIFOCAL CONTACT LENS

FIELD OF THE INVENTION

The present invention relates to a multifocal contact lens and, more particularly, provision of a lens that provides correction for near, distant and intermediate vision.

BACKGROUND OF THE INVENTION

In the past, numerous designs have been proposed for multifocal contact lenses. One of the desires in the art has been to provide a contact lens solution that more satisfactorily addresses the condition of presbyopia, caused by the loss of elasticity or flexibility of the eye's crystalline lens. Presbyopia limits the ability of the natural lens to focus upon near objects. For the patient needing the combination of near vision correction and far vision correction, conventional solutions have included bifocal glasses, the combination of contact lenses, providing distance correction only, with reading glasses, and the provision of a pair of contact lenses each having a different prescription, i.e., a first lens providing one eye with distance correction and a second lens providing the other eye with near vision correction, sometimes referred to as monovision.

Many designs of multifocal contact lens products have become available, but various limitations have resulted in unsatisfactory visual acuity under certain conditions. One such type of multifocal contact lens geometry that has become common is based upon dividing the lens region into concentric optical zones, i.e., a most central optic zone surrounded by one or more distinct and concentrically oriented annular outer zones. When the lens is limited to two constant power zones it has been possible to provide good visual acuity at two distinct distances from the eye, but because the dimensions of the pupil vary from person to person and as a function of illumination, the effective optical area of the outer zone can vary significantly. With this variation the lens performance for near vision or distance vision may be compromised.

To reduce such dependence on pupil size and resulting imbalance of light throughput between near and distance zones of the lens, it has been proposed that additional concentric zones be incorporated in the contact lens in an alternating pattern. See U.S. Pat. No. 4,704,016. While this approach addresses the need for a more balanced throughput at various levels of illumination, it is known that the inclusion of numerous discrete zones can result in creation of diffractive edge effects at the junctions between such zones.

It is also known to provide an aspheric zone between the distance and near vision zones. Such may create a continuous gradient of optical power over a selected range. However, this approach has also been limited by the introduction of diffractive edge effects as well as the influence of pupil size on optical throughput and visual acuity. Moreover, to the extent such systems have been implemented, they have not provided consistent results.

With such limitations and deficiencies there is a need for a contact lens design which provides more acceptable performance for the combination of distance vision, intermediate vision and near vision.

SUMMARY OF THE INVENTION

According to the invention there is now provided an improved multifocal contact lens construction and a method for fabricating a contact lens. According to one embodiment the lens is formed with two focusing zones positioned about a center point of the lens. A first optic zone is formed in a center area of the lens, providing a first power correction for distance vision. A second optic zone is formed concentrically about and contiguous with the first optic zone. The second zone provides a second power correction for near vision beginning at the junction with the first zone and extending radially outward from the junction. Preferably, the first power correction for distance vision is positioned in a most central inner portion of the first optic zone. The first optic zone also includes an outer portion contiguous with the inner portion and characterized by an increasing eccentricity that imparts a power gradient which increases the power up to the second power correction at the junction. Preferably, the power correction in the central inner portion of the first zone is relatively constant, as a function of distance from the center of the lens, in comparison to the power gradient throughout the outer portion of the first optic zone.

According to a method of making a contact lens having a forward surface over which a power profile is defined, a desired distance correction power and a desired near vision correction power are determined for the lens, and a base curve design is specified. A power profile is created along the forward surface which, in combination with the base curve design, provides the desired distance correction power and near vision correction power. Creation of the profile includes forming a first continuous optic zone about the center of the lens surface, with that zone providing the combination of the distance correction power and an intermediate correction power. A second optic zone is formed concentrically about and contiguous with the first optic zone, providing the near vision correction power. The portion of the power profile corresponding to the intermediate correction profile is characterized by a monotonically increasing gradient having a minimum value equal to the distance correction power and a maximum value equal to the near vision correction power. Preferably, the first optic zone is formed with the distance correction portion of the power profile positioned in the center of the lens and the intermediate correction portion of the power profile extending along the forward surface and away from the distance correction portion of the power profile.

BRIEF DESCRIPTION OF THE DRAWING

The invention will be more fully understood when the following detailed description is read in conjunction with the drawings wherein.

In accord with common practice the various illustrated features in the figure are not to scale and may be drawn to emphasize specific features relevant to describing the invention. Moreover, the actual relative sizes of features may depart substantially from the scale with which these are shown in the figures.

DETAILED DESCRIPTION OF THE INVENTION

Figure 1:
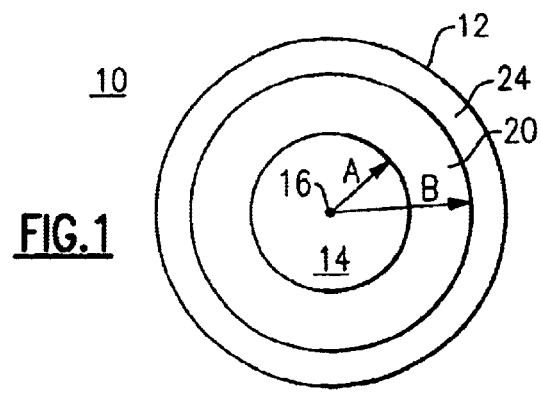
FIG. 1 illustrates the front view of a lens according to the invention.

According to an exemplary embodiment of the invention a lens 10 having a front surface 12 is shown in the schematic view of FIG. 1. The lens 10 may be of the Rigid Gas Permeable (RGP) type or may be a soft lens and for purposes of illustration may be assumed to have a total diameter of 9.6 mm. Other exemplary dimensions are based on this diameter. A first rotationally symmetric central zone 14 is formed along the surface 12. The zone 14 extends from a central point 16 outwardly along the lens surface a distance A. By way of example, A may be about 2.5 mm, but more preferably will be about 3.25 mm.

A second rotationally symmetric zone 20 extends outward along the surface 12 from the first zone 14 to a distance B measured from the central point 16. The distance B may be on the order of about 3.5 mm to about 4.0 mm. The zones 14 and 20 meet at a circular shaped junction 22 which is symmetrically centered about the point 16. The combination of the zone 14 and the zone 20 provide the optical function of the lens 10 while portions of the lens 10 extending beyond the distance B from the central point 16 constitute a carrier region 24.

Figure 2:
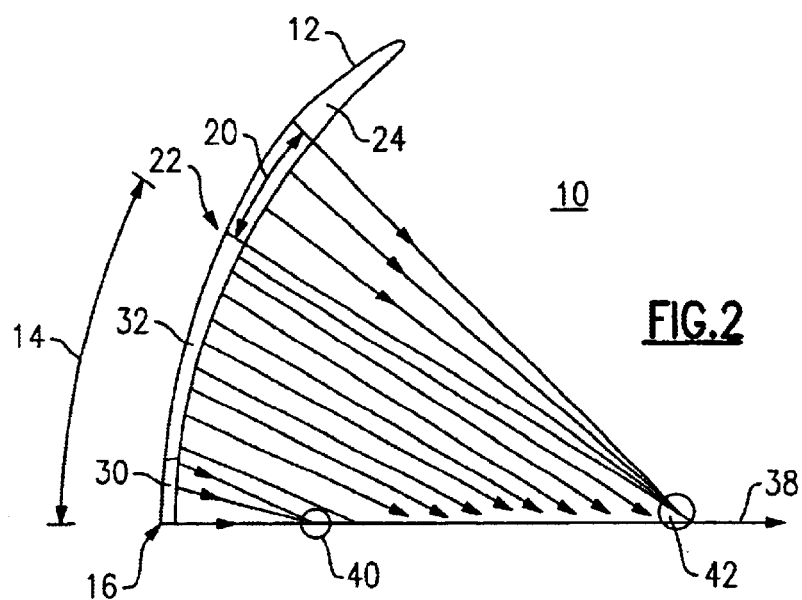
FIG. 2 provides a partial view in cross section of the lens of FIG. 1.

FIG. 2 illustrates a partial view of the lens 10 taken in cross section, including a portion of the lens extending from the central point 16 through the carrier region 24. The first zone 14 and the second zone 20 are conic sections joined tangentially at their junction 22. The lens is designed to provide distance and intermediate power correction through the first zone 14 while the second zone 20 provides near power correction.

As shown in FIG. 2, the first zone 14 includes a distance subregion 30 extending from the center point 16. Preferably this subregion extends about 0.5 mm from the central point 16 in order to provide distance correction. An intermediate subregion 32 of the zone 14 extends about 2 mm beyond the distance subregion 30 to the junction 22 in order to provide a range of intermediate powers. Generally, the SAG for each portion of the surface 12 along the subregions 30 and 32 and along the zone 20 may be computed according to the equation:

$$SAG = \frac{\frac{x^2}{R_v}}{1 + \sqrt{1 - (1+k)\frac{x^2}{R_v^2}}}$$

wherein x is the distance (measured from the central point 16 to another point on the lens surface); $R_v$ is the radius of the lens surface and k is the conic constant.

Figure 3:
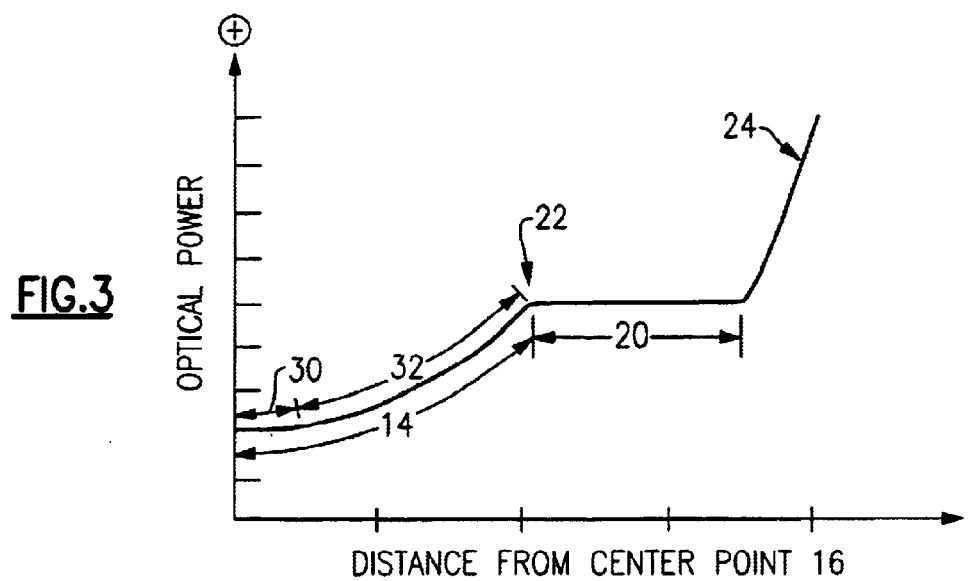
FIG. 3 illustrates a preferred power distribution for the lens of FIG. 1.

FIG. 3 illustrates a preferred power distribution throughout the zones 14 and 20. Notably, the power in the distance subregion 30 is relatively constant, while the power throughout the intermediate subregion 32 is a monotonically increasing function which reaches the near power correction at the junction 22. The zone 20 includes an aspheric surface having an eccentricity calculated to minimize or eliminate spherical aberration. The slope or power gradient in the intermediate subregion 32 is calculated to provide a smooth transistion from the lower power distance subregion 30 to the junction 22 between the intermediate subregion 32 and the near power correction zone 20.

Referring again to FIG. 2, an optical axis 38 is shown extending from the central point 16. A plane wavefront impinging on the distance subregion 30 will converge in a first focal region 40 about the optical axis 38, while portions of the same wavefront impinging on the zone 20 will converge in a second focal region 42 about the optical axis 38. Other portions of the wavefront impinging on the intermediate subregion 32 will reach the optical axis 38 at variable locations as a function of distance along the surface relative to the central point 16.

Alternately, the distance subregion 30 may also be an aspheric curve, preferably with a radius and eccentricity values calculated to provide distance correction with little to no spherical aberration. The eccentricity may be based on the same gradient function according to which the conic constant varies in the intermediate subregion 32. For such embodiments the effective size of the distance subregion will be limited by the associated power gradient.

Figure 4:
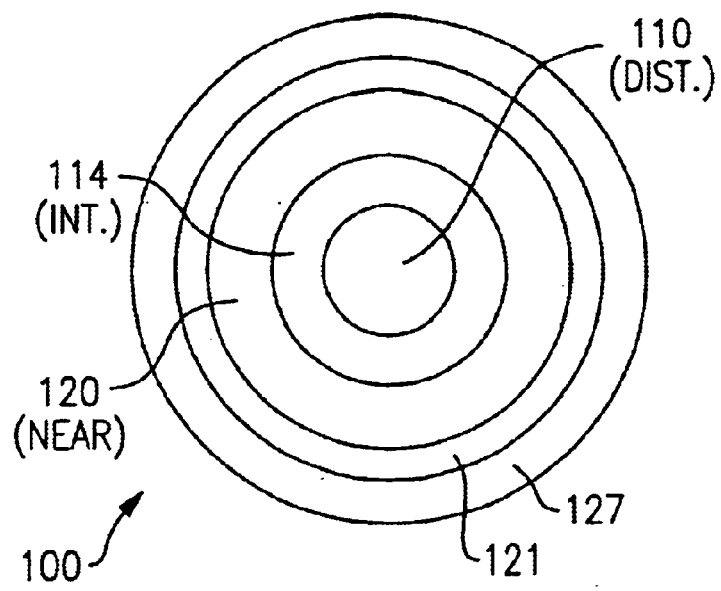
FIG. 4 illustrates a front view of a three zone lens.
Figure 5:
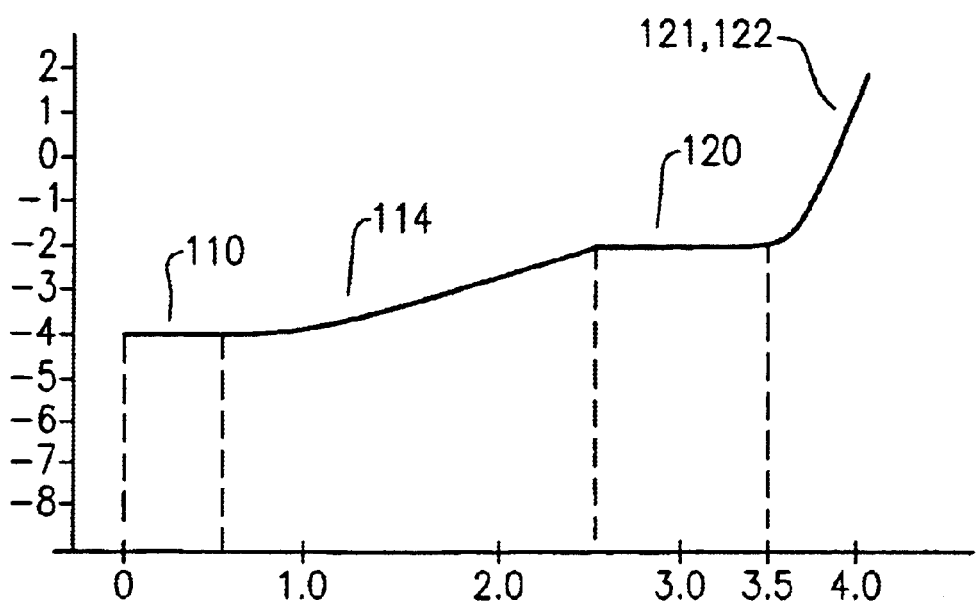
FIG. 5 illustrates the power profile of the lens shown in FIG. 4.

The slope required to produce the desired near power in conic section 20 is calculated at the end of conic section 20 and from this, the eccentricity required to provide this slope is calculated. This eccentricity for the section 20 will provide a near power with little to no spherical aberration present when measured in air. Then, the eccentricity for 14 is calculated to provide a condition of tangency at the junction between sections 14 and 20. The quantity of front peripheral zones as well as the choice of mathematical descriptions for the curves used in the periphery 24 is unlimited. See, for example, FIG. 4 where a lens 100 includes a separate distance zone 110 on the front surface of the lens 100. The separate distance zone 110 is located at the center of the lens and includes an asphere with a radius and eccentricity value calculated to provide distance correction with little to no spherical aberration when measured in air. All of the curves used in the optic zone meet tangentially at their junctions. The optic zone has three sections 110, 114, 120, each containing an aspheric curve with a radius and eccentricity value calculated to provide the desired power profile and meet tangentially at their junctions. Carrier regions 121, 122 are located radially outward of optic zone sections 110, 114, 120. The power profile of lens 100 is shown in FIG. 5. The inner aspheric surface provides a constant power distance zone and the outer aspheric surface provides a constant power near zone. The intermediate zone varies with a near constant change in power between the fixed power distance and near zones.

A feature of the invention relates to the radial distances subscribed by each of the zones. That is, noting that Zone 14 extends a distance A from the center point 16, while zone 20 extends a distance B from the center point, the quantity (B−A) is less than one half the distance A. Preferably (B−A) is less than one third of A. According to one embodiment (B−A) is less than on the order of 7 percent of A, but could be 8 percent or more. A could extend to 90 percent or more of the distance B.

The above concepts may be applied to calculate a unique set of radii and eccentricity values along the surface 12 for each lens prescription, e.g., with consideration given to the size and curvature of the lens base. That is, by tailoring the power profile to the other lens parameters such as cornea curvature, repeatable performance of the lens design can be achieved from patient to patient. Given that the surface 12 is determinable by ray tracing, the power curve can be created along any base specification as a function of (i) distance from the center of the lens to each point on the surface; (ii) the sag at that point; and (iii) the slope at that point.

Another feature of the invention is the minimum effective size of the zone 14 relative to the zone 20. The near power second zone is situated exterior to the first zone and thus is subject to greater variation in light throughput based on changes in pupil size. On the other hand, changes in pupil size have a lesser effect on intermediate and distance vision. This is believed to be a more beneficial arrangement than prior art systems which position the distance vision zone outside the near vision zone. That is, the patient is likely to have greater ability to control levels of illumination in the near vision zone, e.g., when reading, than in the distance vision zone, e.g., when driving a vehicle at night.

While certain preferred embodiments of the invention have been disclosed, numerous other configurations will be apparent to those skilled in the art that. For example, it is contemplated that additional optic zones may be placed on the lens while retaining the described qualitative features of the disclosed power profile, e.g., see FIG. 3, such that multiple distance zones or multiple near vision zones could be configured on the lens. For example, a second near vision zone may be formed within the described subregion 30 and such a zone may be separated from the subregion 30 by another intermediate subregion providing a range of powers. Accordingly, the scope of the invention is only to be limited by the claims which now follow.

I claim:

1. A multifocal contact lens formed with two focusing zones positioned about a center point of the lens, the first optic zone formed in a center area of the lens providing a first power correction for distance vision, the second optic zone formed concentrically about and contiguous with the first optic zone, there being a junction between the first and second zones, said second zone providing a second power correction for near vision beginning at said junction and extending radially outward from said junction, the first power correction for distance vision positioned in a most central inner portion of the first optic zone, the first optic zone further comprising an outer portion contiguous with the inner portion and characterized by an increasing eccentricity that imparts a power gradient which increases the power up to the second power correction at said junction, wherein the power correction in the central inner portion of the first zone is relatively constant, as a function of distance from the center of the lens, in comparison to the power gradient throughout the outer portion of the first optic zone.

2. A multifocal contact lens formed with two focusing zones positioned about a center point of the lens, the first optic zone formed in a center area of the lens providing a first power correction for distance vision, the second optic zone formed concentrically about and contiguous with the first optic zone, there being a junction between the first and second zones, said second zone providing a second power correction for near vision beginning at said junction and extending radially outward from said junction, the first power correction for distance vision positioned in a most central inner portion of the first optic zone, the first optic zone further comprising an outer portion contiguous with the inner portion and characterized by an increasing eccentricity that imparts a power gradient which increases the power up to the second power correction at said junction, wherein the outer portion of the first zone extends a distance from the center point which is at least four times the radial distance that the central inner portion extends from the center point.

3. A multifocal contact lens formed with two focusing zones positioned about a center point of the lens, the first optic zone formed in a center area of the lens providing a first power correction for distance vision, the second optic zone formed concentrically about and contiguous with the first optic zone, there being a junction between the first and second zones, said second zone providing a second power correction for near vision beginning at said junction and extending radially outward from said junction, the first power correction for distance vision positioned in a most central inner portion of the first optic zone, the first optic zone further comprising an outer portion contiguous with the inner portion and characterized by an increasing eccentricity that imparts a power gradient which increases the power up to the second power correction at said junction, wherein the second zone includes an eccentricity that extends radially away from the center point and renders the power correction of the second zone relatively constant as a function of radial distance from the center point.

4. A multifocal contact lens formed with two focusing zones positioned about a center point of the lens, the first optic zone formed in a center area of the lens providing a first power correction for distance vision, the second optic zone formed concentrically about and contiguous with the first optic zone, there being a junction between the first and second zones, said second zone providing a second power correction for near vision beginning at said junction and extending radially outward from said junction, the first power correction for distance vision positioned in a most central inner portion of the first optic zone, the first optic zone further comprising an outer portion contiguous with the inner portion and characterized by an increasing eccentricity that imparts a power gradient which increases the power up to the second power correction at said junction, wherein the second optic zone extends to a predetermined radial distance from the center point and the first optic zone extends at least 90 percent of said radial distance such that the second optic zone extends over no more than 10 percent of said radial distance.

5. The lens of claim 4 wherein the second optic zone extends over no more than 8 percent of said radial distance.

6. The lens of claim 1 wherein the most central inner portion of the first optic zone includes a spherical lens shape while the outer portion of the first optic zone includes an aspherical surface.

7. The lens of claim 1 wherein the power in the outer portion of the first zone continuously increases from the first power correction to the second power correction.

8. The lens of claim 1 containing only two optic zones.

9. A method of making a contact lens having a forward surface over which a power profile is defined, comprising the steps of:

determining a desired distance correction power and a desired near vision correction power for the lens;

determining a base curve design for the lens;

providing a power profile along the forward surface which, in combination with the base curve design, provides the desired distance correction power and near vision correction power, wherein creation of the profile includes:

forming a first continuous optic zone about the center of the lens surface, said first zone providing the combination of the distance correction power comprising in inner portion of the lens, and an intermediate correction power comprising an outer portion contiguous with the inner portion;

forming a second optic zone concentrically about and contiguous with the first optic zone, said second zone providing the near vision correction power; and wherein the portion of the power profile corresponding to the intermediate correction power is characterized by a monotonically increasing gradient having a minimum value equal to the distance correction power and a maximum value equal to the near vision correction power and wherein the power correction in the central inner portion of the first zone is relatively constant, as a function of distance from the center of the lens, in comparison to the power gradient throughout the outer portion of the first optic zone.

10. The method of claim 9 wherein the outer portion of the first zone extends a distance from the center point which is at least four times the radial distance that the central inner portion extends from the center point.

11. The method of claim 9 wherein the second zone includes an eccentricity that extends radially away from the center point and renders the power correction of the second zone relatively constant as a function of radial distance from the center point.

12. The method of claim 9 wherein the second optic zone extends to a predetermined radial distance from the center point and the first optic zone extends at least 90 percent of said radial distance such that the second optic zone extends over no more than 10 percent of said radial distance.

13. The lens of claim 12 wherein the second optic zone extends over no more than 8 percent of said radial distance.

14. The lens of claim 9 wherein the most central inner portion of the first optic zone includes a spherical lens shape while the outer portion of the first optic zone includes an aspherical surface.

15. The lens of claim 9 wherein the power in the outer portion of the first zone continuously increases from the first power correction to the second power correction.

16. The lens of claim 9 containing only two optic zones.

* * * * *

UNITED STATES PATENT AND TRADEMARK OFFICE
CERTIFICATE OF CORRECTION

PATENT NO. : 6,874,887 B2
DATED : April 5, 2005
INVENTOR(S) : Mark K. Tyson

It is certified that error appears in the above-identified patent and that said Letters Patent is hereby corrected as shown below:

Column 6,
Line 61, replace "in" with -- an --.

Column 8,
Line 6, replace "lens" with -- method --.

Column 8,
Line 8, replace "The lens of claim 9" with -- The method of claim 9 --.
Line 12, replace "lens" with -- method --.
Line 15, replace "lens" with -- method --.

Signed and Sealed this

Twenty-third Day of August, 2005

JON W. DUDAS
*Director of the United States Patent and Trademark Office*